United States Patent [19]

Peterson

[11] 4,435,659
[45] Mar. 6, 1984

[54] SPEED SENSOR FOR AN ELECTROMAGNETIC MACHINE

[75] Inventor: Arnold D. Peterson, Sidney, N.Y.

[73] Assignee: The Bendix Corporation, Southfield, Mich.

[21] Appl. No.: 431,863

[22] Filed: Sep. 30, 1982

[51] Int. Cl.³ ............................................ H02K 11/00
[52] U.S. Cl. ................................ 310/68 R; 310/68 C; 310/68 D; 324/158 MG
[58] Field of Search ..................... 310/72, 68 R, 68 C, 310/68 D; 324/158 MG

[56] References Cited

U.S. PATENT DOCUMENTS

| | | | |
|---|---|---|---|
| 1,522,196 | 1/1925 | MacMillan | 324/158 MG |
| 2,330,991 | 10/1943 | Newton | 310/68 D |
| 2,464,999 | 3/1949 | Swarr | 310/68 D |
| 2,794,136 | 5/1957 | Kalikow et al. | 310/68 C |
| 3,466,477 | 9/1969 | Newill | 310/68 R |
| 3,867,657 | 2/1975 | Yates et al. | 310/72 X |
| 4,140,933 | 2/1979 | Wambsgannss et al. | 310/72 X |
| 4,321,493 | 3/1982 | Wefel | 310/68 D |

Primary Examiner—Donovan F. Duggan
Attorney, Agent, or Firm—Thomas K. Ziegler; Raymond J. Eifler

[57] ABSTRACT

A speed sensor (30) for an electromagnetic machine (31) such as a permanent magnet generator includes a magnetic core (44) mounted laterally outboard of the machine's stator teeth (36) and having at least one leg (48) adjacent openings (43) in slots (38) between the stator teeth (36) which extends into the alternating magnetic flux field (42) generated by the machine's rotor (34) in order to pick up a sample (42) of the rotor flux. A portion (50) of the core (44) has wrapped therearound an electrical coil (52) within which there is induced by the flux sample (42) an alternating electrical signal having a frequency proportional to the angular velocity of the rotor (34). The magnetic core (44) may consist of either one or more discrete U-shaped members (44) each having legs (46,48) immediately adjacent or extending into the slots (38) of the stator (32) or a continuous strip (44f,44g) of material extending circumferentially around the stator (32) and having a plurality of the legs (48).

28 Claims, 24 Drawing Figures

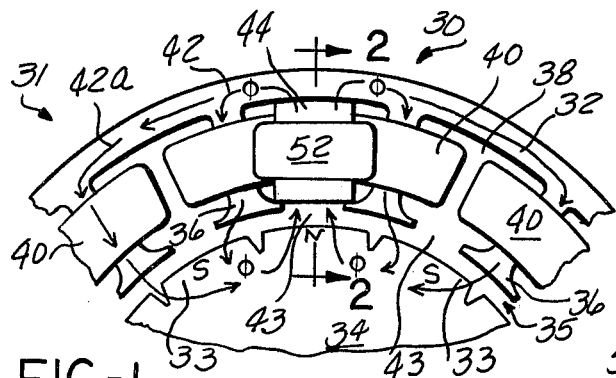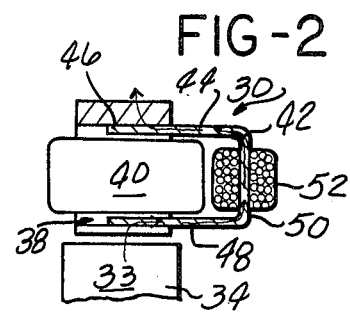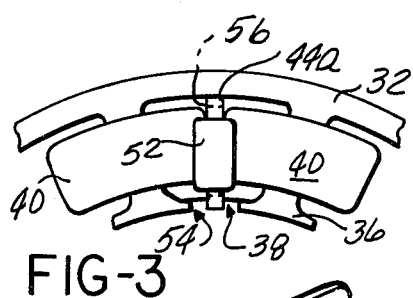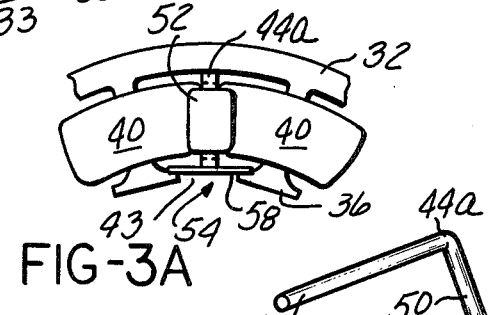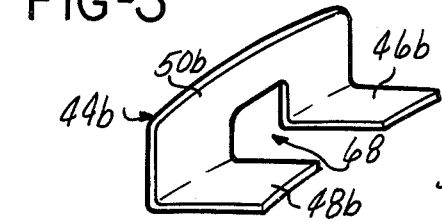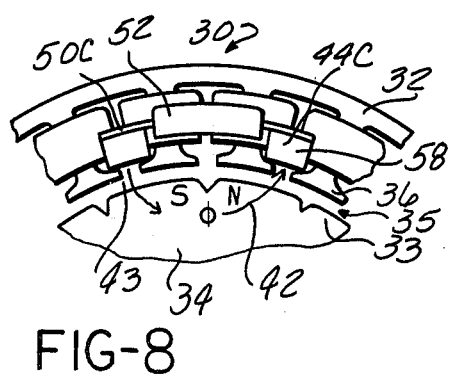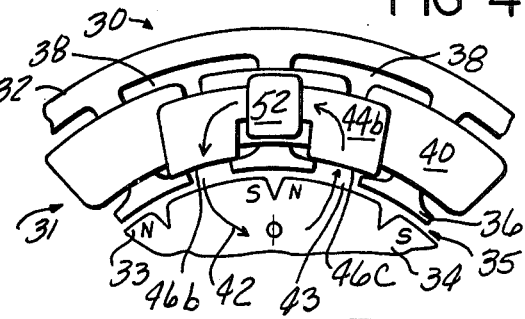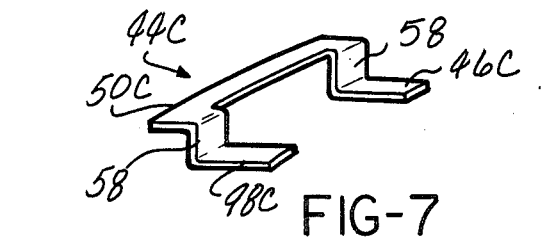

SPEED SENSOR FOR AN ELECTROMAGNETIC MACHINE

This invention relates to a speed sensor for an electromagnetic machine and is more specifically related to a sensor which produces a speed signal using an isolated sample of the alternating magnetic flux created by the rotor of a synchronous electrical generator.

Sensing windings have long been employed for sensing the speed of an electromagnetic machine, such as a synchronous generator. These sensing windings produce an output signal indicative of the machine's speed which is normally delivered to a frequency sensing circuit. In the past, the speed sensing winding has been manufactured integral with the machine and normally consists of several turns of a coil wound around one or more of the stator teeth which are otherwise employed for one or more phases of the main output winding of the machine. Since the sensing coil is linked by various alternating fluxes present in the stator teeth, close magnetic coupling exists between the sensing coil and at least one phase of the main output windings. As a consequence of this close magnetic coupling, the waveform of the speed signal is substantially distorted due to diode commutation in those applications wherein the main output winding output is rectified. Furthermore, a significant amount of high frequency noise is induced in the speed signal waveform in those applications wherein the loading of the rectified outputs of the main output windings are regulated by means of shunt switching regulators which continuously switch such windings from no-load to short circuit at a relatively high frequency.

Electromagnetic machines, and especially generators, having integrally formed speed sensors possess a number of other disadvantages. For example, the dedication of a prescribed number of stator teeth and slots solely for speed sensor coil windings not only reduces generator output capacity but also complicate the configuration of the main output windings in a manner which precludes many preferred arrangements thereof.

In the past, in order to partially alleviate the problems discussed above, a filter circuit was employed to eliminate diode commutation noise from the speed signal and a low inductance capacitor was sometimes required to eliminate switching noise in the speed signal.

Certain applications for speed sensors in electromagnetic machines dictate the need to eliminate external filtering circuits yet require a "clean" speed signal.

DISCLOSURE OF THE INVENTION

This invention provides a speed sensor for an electromagnetic machine which provides a clean speed signal without the need for external filtering circuits and which may be employed without compromising preferred arrangements of main output windings. The invention is characterized by a magnetic core mounted laterally outboard of the machine's stator teeth which includes at least one leg extending into the alternating magnetic flux field generated by the rotor within the region of the stator slot openings, thereby picking up a sample of the rotor flux. The magnetic core is magnetically isolated from those flux fields in the stator which are associated with the main output windings and is provided with an electrical coil within which there is induced by the flux sample an alternating electrical signal having a frequency proportional to the angular velocity of the rotor.

Accordingly, it is an advantage of this invention to provide a speed sensor which is magnetically isolated from the main output windings of an electromagnetic machine and produces a clean speed signal without the need for filtering circuits.

Another advantage of this invention is that it provides a speed sensor which is not an integral part of the stator and is therefore suitable for use with various types of output winding configurations.

Another advantage of this invention is that it provides a speed sensor which does not require dedication of stator teeth to speed windings and therefore allows full utilization of the stator teeth for output windings.

DETAILED DESCRIPTION OF THE INVENTION

FIG. 1 is a fragmentary, elevational view of an electromagnetic machine employing the speed sensor which forms the preferred embodiment of the present invention;

FIG. 2 is a sectional view taken along the line 2—2 in FIG. 1;

FIG. 3 is a view similar to FIG. 1 but depicting an alternate form of the speed sensor;

FIG. 3a is a view similar to FIG. 3 and depicting alternate means for retaining the speed sensor in the stator slot;

FIG. 4 is a perspective view of an alternate form of the magnetic core for use in the speed sensor;

FIG. 5 is a view similar to FIG. 1 but depicting an alternate form of the speed sensor;

FIG. 6 is a perspective view of the magnetic core employed in the speed sensor shown in FIG. 5;

FIG. 7 is a perspective view of another alternate form of the magnetic core;

FIG. 8 is a view similar to FIG. 1 but depicting a speed sensor employing the magnetic core shown in FIG. 7;

Figures 19, 23:
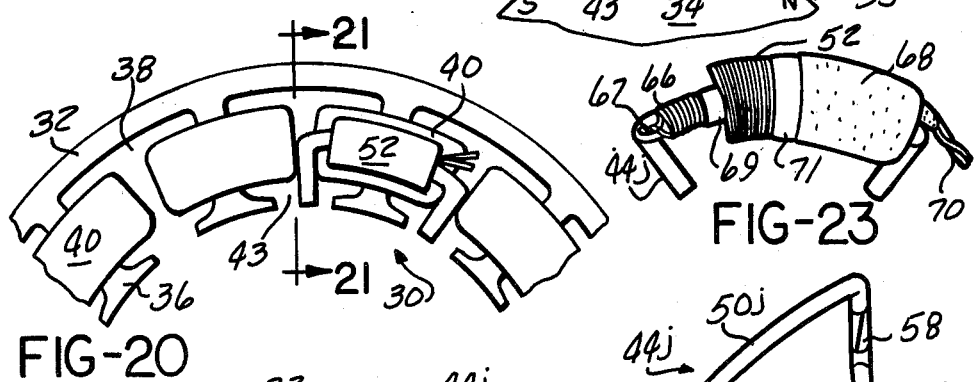
FIG. 19 is a view similar to FIG. 1 but depicting another alternate form of the speed sensor.
Figures 20, 21, 22:
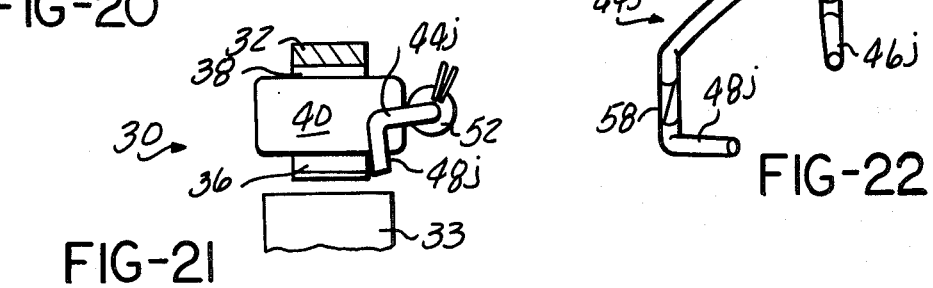
FIG. 20 is a view similar to FIG. 1 but depicting another alternate form of the speed sensor.
FIG. 21 is a cross-sectional view taken along the lines 21—21 in FIG. 20.

FIG. 22 is a perspective view of the magnetic core employed in the speed sensor shown in FIGS. 20 and 21; and FIG. 23 is a side view of the speed sensor shown in FIGS. 20 and 21, parts being broken away for clarity. Referring to FIG. 1, the present invention broadly involves a speed sensor, generally indicated by the numeral 30, adapted for use in sensing the speed of an electromagnetic machine 31 which may comprise by way of example a permanent magnetic synchronous generator. The machine 31 includes a ring-shaped stator 32 within which there is rotatably mounted a rotor 34 having a plurality of alternately disposed magnetic poles 33. Stator 32 includes a plurality of circumferentially spaced, radially extending stator teeth 36 between which there are defined stator slots 38 each having an opening 54 adjacent the air gap 35. A plurality of stator coils 40 are wrapped around adjacent ones of the stator teeth 36 and form the main output windings of the machine 31. The free extremities of the stator teeth 36 are separated by a small air gap 35 from the poles 33 of rotor 34, thus magnetically coupling the stator 32 with the rotor 34. A sample of the flux generated by the rotor 34 which is employed by the sensor 30 is indicated by the path designated by the greek letter $\phi$ and the numeral 42.

FIG. 2 shows a cross section of the speed sensor 30 which includes a U-shaped magnetic core 44 having a pair of spaced apart legs 46,48 which extend parallel to each other and into one of the stator slots 38 respectively above and below the stator coil 40. It may thus be appreciated that leg 48 is positioned sufficiently close to air gap 35 so as to be disposed within the magnetic field generated by the rotor 34. Magnetic core 44 is of unitary construction formed from flat stock of any suitable magnetic material such as silicon iron and includes a bight portion 50 connecting one end of legs 46,48 and extending laterally from the stator 32. A plurality of turns of an electrical conductor wrapped around bight portion 50 define an electrical coil 52 whose output leads (not shown) are coupled with a suitable speed sensing circuit (not shown) the details of which circuit are conventional and therefore need not be discussed in detail herein. The speed sensor 30 is mounted laterally adjacent the stator slot 38 by any suitable means such as by attaching the leg 46 to the base of stator 32 within slot 38. The legs 46 and 48 of the magnetic core 44 may penetrate the stator slot 38 either partially or the complete length of the stator core 32.

FIG. 3 depicts an alternate form of the speed sensor 30 which employs a relatively narrow magnetic core 44a of unitary construction which possesses a substantially rectangular cross-section. Core 44a is substantially centrally located within the stator slot 38, equally circumferentially spaced from the sides of the adjacent stator teeth 36. Core 44a may be held in place within stator slot 38 by mounting means 54 comprising a quantity of epoxy encapsulation 56 filling the stator slot 38 and surrounding the upper leg 46 of core 44a.

FIG. 3a depicts a speed sensor 30 similar to that shown in FIG. 3 but wherein the lower leg 48 of the core 44a is radially inset above the free ends of the adjacent stator teeth 36 and is supported by an insulative support 58 which extends transversely between and is secured to the opposing extremities of the stator teeth 36.

FIG. 4 depicts a core 44a having a circular cross-section which is suitable for use with the speed sensor 30.

It should be noted that the stator slot 38 and rotor pole pitches of the machine 31 shown in FIGS. 1 and 2 are equal, i.e., the stator teeth 36 equal the number of rotor poles as is commonly the case for single phase machines. If the number of stator teeth 36 exceeds the number of rotor poles, as would be necessary for distributed wound polyphase machines, the sensor 30 shown in FIG. 1 may nevertheless be employed, however the flux sample 42 will return from the stator 32 to the rotor south poles via a different set of stator teeth than shown in FIG. 1.

FIG. 5 shows an alternate form of the speed sensor 30, having a magnetic core 44b of unitary construction fabricated from strip or sheet material and which includes a pair of substantially flat, circumferentially spaced legs 46b,48b which respectively extend into adjacent ones of the stator slots 38 between the free extremities of the stator teeth 36 and stator coil 40. The flux sample path 42 extends from a north rotor pole 33 across the air gap 35 to one sensor leg 48b, through the bight portion 50b to the other leg 46b, and thence back across the air gap 35 to the adjacent south rotor pole 33.

FIG. 6 is a perspective view of the magnetic core 44b depicting the manner in which the legs 46b,48b are connected by a substantially flat bight portion 50b which extends substantially perpendicular to legs 46b,48b. Bight portion 50b includes a rectangular opening 68 near the bottom thereof in order to accomodate the coil winding 52.

FIG. 7 is a perspective view of a magnetic core 44c for use in the speed sensor 30, which is manufactured from a sheet or strip material and includes a substantially flat bight portion 50c connected to a pair of flat legs 46c,48c by means of connecting portions 58 which extend perpendicular between legs 46c,48c and bight portion 50c. Core 44c requires less radial depth and more axial length compared to core 44b shown in FIG. 6.

FIG. 8 shows an alternate form of the speed sensor 30 employing the magnetic core 44c and which is depicted in association with a machine 31 having a number of stator slots 38 greater than the number of poles 33 on rotor 34, the ratio of slots 38 to poles 33 being 1.5 to 1. In this application of the speed sensor 30, since it is not possible to locate the core legs 48 exactly one rotor pole pitch apart as shown in FIG. 5, such legs are located two stator slot pitches apart. Although the core legs 48 could also be located in adjacent stator slots, the greater span between the legs provides greater axial length for the coil 52. In fact, regardless of the slots-to-poles ratio, the legs 46,48 may be separated by any number of stator slots provided such leg spacing is not equivalent to an even integral number of rotor poles. Thus, for the embodiment shown in FIG. 8, the allowable leg separations would be 1,2,4,5,7,8, etc. stator slots.

In connection with each of the embodiments of the speed sensor described herein, insulating tape, sheet insulation or fluid bed powder is applied to the bight portion 50 underlying the coil 52 in order to insulate the coil 52 from the core 44.

Figure 9:
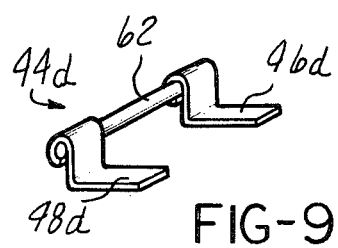
FIG. 9 is a perspective view of another alternate form of the magnetic core.

Referring now to FIG. 9, another form of the magnetic core 44d is depicted in which a rod 62 of soft magnetic material has the opposite ends thereof respectively attached as by crimping, rolling or tack welding to a pair of legs 46d, 48d. This type of construction may be employed with a pre-wound coil 52 in the form of a bobbin (not shown) which is slided into the rod 62 prior to attach legs 46d,48d.

Figure 10:
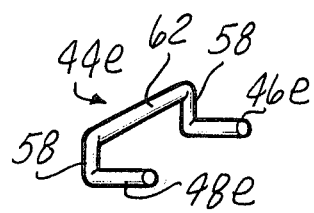
FIG. 10 is a perspective view of another alternate form of the magnetic core.

FIG. 10 depicts a one-piece core construction 44e formed from bar stock with a circular cross-section and having a configuration essentially like core 44b, the rod 62 being connected to legs 46e,48e by integrally formed connecting portions 58.

At this point is is believed apparent that a single stator 32 may accomodate a plurality of the speed sensors 30 using various ones of the stator slots 38. The use of a plurality of the sensors 30 may be employed to derive multiple speed signals or alternatively, the coils 52 of the speed sensors 30 may be connected in series to provide a single output speed signal of increased amplitude, in which case it is necessary to locate the speed sensors 30 in a manner which assures that all of the resulting output signals are in phase with each other.

Figure 11:
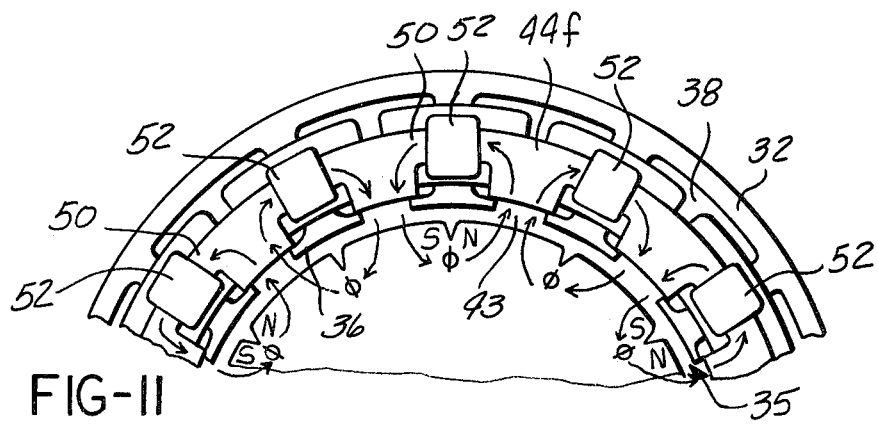
FIG. 11 is a view similar to FIG. 1 but depicting an alternate form of the speed sensor.

FIG. 11 shows a magnetic core 44f which extends circumferentially around the stator 32 in order to derive a plurality of speed signals. Core 44f includes a plurality of legs 46,48 respectively extending into the stator slots 38 and is provided with a plurality of interconnected bight portions 50 upon which there is disposed respectively corresponding coils 52.

Figures 12, 14:
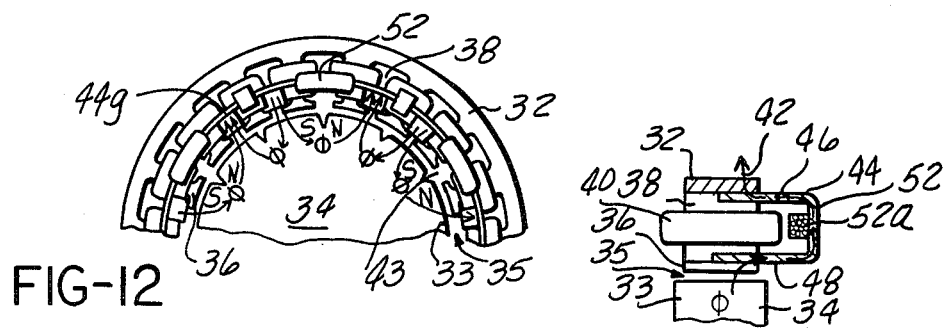
FIG. 12 is a view similar to FIG. 1 but depicting another alternate form of the speed sensor.
FIG. 14 is a sectional view taken along the line 14—14 in FIG. 13.

FIG. 12 depicts a circumferentially extending magnetic core 44g similar to the configuration depicted in FIG. 8 but employing a plurality of coils 52. Note, however, that the spacing between the legs 46,48 alternates between one and two stator slots 38 since there are one and half times as many stator teeth 36 as rotor poles 33. As a result, the spacing between adjacent legs 46,48 of the core 44g varies so as to allow for the use of both narrow and wide coils 52.

Figure 13:
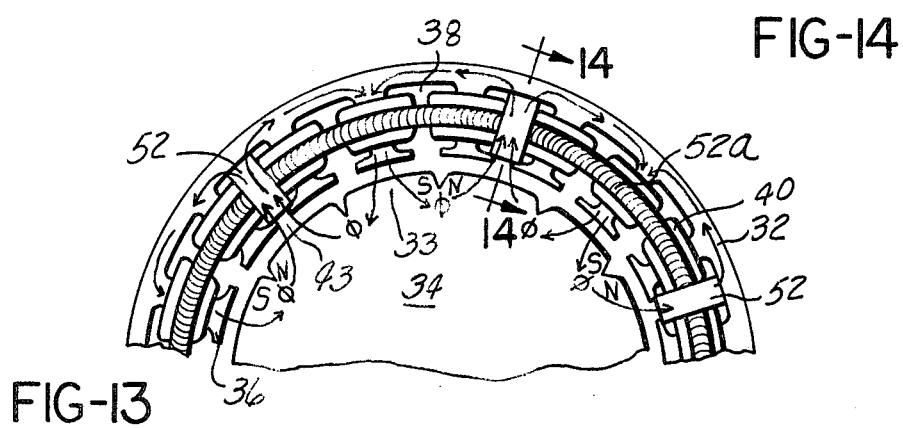
FIG. 13 is a view similar to FIG. 1 but depicting another alternate form of the speed sensor.

FIG. 13 depicts a plurality of the magnetic cores 44 of the type depicted in FIGS. 1 and 2 but which are employed in combination with a circumferentially extending, continuous coil 52a disposed inside bight portion 50 and between legs 46 and 48. Assuming that six of the magnetic cores 44 are employed at equally spaced locations around the stator 32, and that the rotor 34 employs twelve poles, the fluxes in all six of the cores 44 will be in phase.

FIG. 14 is a cross-sectional view of the speed sensor 30 shown in FIG. 13 and depicting the coil 52a disposed between bight portion 50 and stator coil 40.

Figures 15, 16:
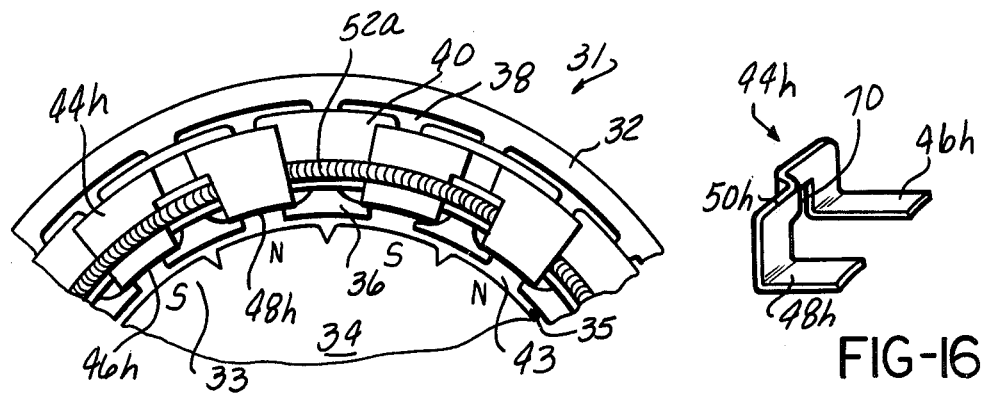
FIG. 15 is a view similar to FIG. 1 but depicting another alternate form of the speed sensor.
FIG. 16 is a perspective view of the magnetic core employed in the speed sensor shown in FIG. 15.

Referring to FIG. 15, the continuous coil 52a of the speed sensor 30 extending circumferentially around the stator 32 may be employed in combination with a plurality of magnetic cores 44h of the type having legs 46,48 extending into adjacent ones of the stator slots 38. The speed sensor arrangement shown in FIG. 15 may be employed in machines where the stator teeth 36 are not equal to the number of rotor poles 33, provided the cores 44h are located in the proper stator slots 38 so as to maintain the necessary in-phase relationship of the fluxes in all of the cores 44h. Moreover, it is believed apparent at this point that a single, continuous sensor coil 52a may be employed in combination with a circumferentially extending continuous core 44 of the general type depicted in FIGS. 11 and 12 in which case the coil 52a would be made to weave in and out of the openings between the legs 48 or, alternatively, the core 44 may be provided with off-set portions between the legs 46,48 to produce openings 70 through which the continuous coil 52a may be trained.

FIG. 16 is a perspective view of the magnetic core 44h which includes a pair of legs 46h,48h connected to opposite ends of a bight portion 50h having an off-set therein defining an opening 70 through which the continuous coil 52a extends.

Figures 17, 18:
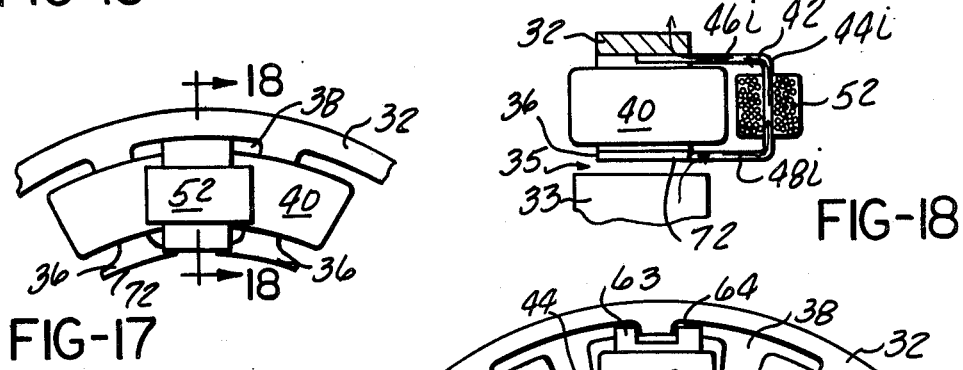
FIG. 17 is a view similar to FIG. 1 but depicting another alternate form of the speed sensor.
FIG. 18 is a sectional view taken along the line 18—18 in FIG. 17.

FIG. 17 depicts a speed sensor 30 which senses a sample 42 of the rotor flux from a portion of the rotor stack which axially overhangs the stator stack, thus minimizing stator slot leakage permeance.

FIG. 18 is a cross-sectional view of the speed sensor 30 shown in FIG. 17 wherein the magnetic core 44i includes a lower leg 48i which is somewhat shorter than the upper leg 46i, the free extremity of leg 48i abutting the end 72 of the stator tooth 36.

In this arrangement, the magnetic flux sample 42 enters the lower surface of the leg 48i radially from the overhung end of rotor north pole 33. The remainder of the flux path through the sensor 30, the stator 32, and back to the adjacent rotor south pole 33 is identical to that described with respect to FIG. 1. From the foregoing, it is thus apparent that since leg 48i need not penetrate the stator slot 38 in order to pick-up a sample of magnetic flux, the core 44 may be located at any point around the periphery of the stator 32, providing that leg 48i is disposed adjacent air gap 35. FIG. 19 depicts a speed sensor 30 having a magnetic core 44 provided with an upper leg 46 which is bifurcated to define two portions 63 and 64 respectively disposed on opposite sides of stator tooth 36. This form of the magnetic core 44 allows the speed sensor 30 to be located at a point not aligned with a stator slot 38.

FIG. 20 depicts another alternate form of the speed sensor 30, employing a magnetic core 44j of the type which picks up a sample 42 of the flux emanating radially from the overhung end of a rotor pole 33 to the end surface or core leg 48j.

FIG. 21 is a side view of the speed sensor 30 shown in FIG. 20.

FIG. 22 is a perspective view of the magnetic core 44j shown in FIGS. 20 and 21. Core 44j includes a slightly arcuate bight portion 50j coupled with a pair of inwardly turned legs 46j,48j, by means of connecting portions 58. Legs 46j,48j extend radially inward along the centerlines of adjacent stator slots 38 and generally parallel to the outer lateral face of the stator teeth.

FIG. 23 depicts an internal construction of the speed sensor 30 which is suitable for each of the embodiments described above with the exception of that shown in FIG. 13. Although each of the sensors 30 described herein above feature magnetic circuits which are magnetically isolated from the various alternating magnetic fields which normally exist in the stator 32 and teeth 36, some coupling of very high frequency noise signals directly between the stator winding and/or its leads and the sensor coil 52 and/or its leads can occur when very high frequency currents (such as that caused by rapid and repetitive load switching) are present in the stator coils 40. The construction shown in FIG. 23 provides an effective means of shielding which substantially eliminates coupling of high frequency noise signals into the output of the sensor 30. Referring to FIG. 23, a copper braid shield 68 completely surrounds the coil winding 52, fitting tightly around and electrically grounded to the core legs 46 and 48 where the latter emerge from the shield 68. The shield 68 continues, at a reduced diameter, around the sensor leads 70 which are formed as a twisted pair inside the shield 68. The braid shield 68 is also grounded to the stator enclosure (not shown) at a point as near as possible to the point of termination, i.e., an electrical connector or terminal strip, of the sensor leads. Insulation 71 in the form of sleeving or tape is applied over the coil winding 52 to insulate it from the braid shield 68.

Optionally, a single layer winding 66 of magnet wire wound directly over core portion 50 has the opposite ends thereof shorted at 67. Insulation sleeving or tape 69 is applied over the shorted winding 66, insulating the latter from sensor output winding 52. Shorted winding 66 may also take the form of either heavy copper plating of core portion 50 or one or more layers of copper foil wrapped and soldered around core portion 50. The shorted winding 66 improves the speed signal voltage waveform by virtue of the greater attenuating effect of current flow in the shorted turn winding 66 on the higher frequency components of sensor flux. Essentially sinusoidal waveforms of sensor output voltage can be obtained by combining the shielding described above with appropriate selection of the sensor core geometry relative to stator slots/rotor pole geometry.

Turning now to a description of the operation of the speed sensor of the present invention, and referring to FIGS. 1-3a, as the rotor 34 rotates, north and south poles of rotor 34 alternately pass the free ends of the stator teeth 36, thus creating a magnetic field in the stator 32. When the poles 33 of rotor 34 are out of registration with the stator teeth 36, a small sample 42 of rotor flux passes across the air gap 35 from a north rotor pole 33 to core leg 48, through bight portion 50 to leg 46, and thence to the stator core 32 from which it passes back across air gap 35 to south rotor pole 33 via stator teeth 36 on opposite sides of sensor 30. Recalling that the magnetic field created by the rotor 34 alternates upon rotation of the rotor 34, it may be appreciated that the flux sample 42 passing through bight portion 50 of the core 44 likewise alternates, thus generating an alternating electrical signal within coil 52, the frequency of which signal is proportional to the speed of rotor 34 relative to stator 32. The amplitude of the speed signal output voltage from coil 52 is proportional to the number of coil turns therein and the depth of penetration of legs 46,48 into the stator 32. The resulting speed signal output voltage amplitude and waveform from coil 52 are functions of the stator slot 38-to-tooth 36 width ratio and rotor 34 per unit of pole arc. It may be readily appreciated at this point that the speed sensor 30 employs an auxiliary magnetic circuit including the magnetic core 44 and coil 52 which is isolated from the stator coil 40, and hence generates a relatively clean signal regardless of the distortion of the main stator winding currents, and consequently the stator fluxes caused by rectifier loading and/or regulator switching.

The relatively substantial width of the magnetic core 44 shown in FIGS. 1 and 2 results in a modest increase in slot permeance and slot leakage reactance associated with the main winding coils surrounding the adjacent stator teeth. This effect is minimized and the speed signal waveform is suitably altered by employing the relatively narrow magnetic core 44a depicted in FIGS. 3-4.

In connection with the embodiments of the speed sensor shown in FIGS. 1-4, it will be observed that the sensor flux sample 42 returns to the rotor 34 through stator teeth 36. However, the invention is well adapted to also avoid the use of stator teeth for the flux sample 42 return path as exemplified by the embodiment depicted in FIGS. 5 and 6. As previously indicated, the sensor flux sample path 42 extends from a north rotor pole 33 across the air gap 35 to one sensor leg 48b, through the bight portion 50b to the other leg 46b, and back across the air gap 35 to the adjacent south rotor pole 33.

In connection with each of the embodiments of the invention shown in FIGS. 1-16, the speed sensor 30 samples magnetic flux generated by rotor 34 in the region which lies between the stator teeth 36 and the stator bore within the confines of the stator stack, i.e., within the stator slots 38. However, as noted earlier, the presence of core legs 46,48 at these locations result in a slight increase in the stator slot leakage permeance. This adverse effect is avoided by sensing a sample of the rotor flux from a portion of the rotor stack which axially overhangs the stator stack as depicted in FIGS. 17-20.

While a preferred embodiment of this invention has been disclosed, it will be apparent to those skilled in the art, that changes may be made to the invention as set forth in the appended claims, and in some instances, certain features of the invention may be used to advantage without corresponding use of other features. Accordingly, it is intended that the illustrative and descriptive material therein be used to illustrate the principles of the invention and not to limit the scope thereof.

Having thus described the invention, what is claimed is:

1. In a speed sensor for an electromagnetic machine of the type including the combination of a stator having a plurality of stator coils, a plurality of stator teeth, and a plurality of stator slots respectively between said teeth, and a rotor separated from said stator by an air gap, said rotor being adapted to rotate relative to said stator and generating a magnetic field inducing magnetic flux in said stator, the improvement comprising:
   a magnetic core having at least one leg extending into one of said stator slots and adapted to be magnetically coupled with the magnetic field generated by said rotor upon rotation of said rotor;
   a winding magnetically coupled with said core and within which there is induced an alternating electrical signal having a frequency proportional to the speed of said rotor relative to said stator; and
   means for mounting said one leg within said one stator slot, said mounting means including an insulative medium substantially filling said one stator slot and surrounding said one leg.

2. In a speed sensor for an electromagnetic machine of the type including the combination of a stator having a plurality of stator coils, a plurality of stator teeth, and a plurality of stator slots respectively between said teeth, and a rotor separated from said stator by an air gap, said rotor being adapted to rotate relative to said stator and generating a magnetic field inducing magnetic flux in said stator, the improvement comprising:
   a magnetic core having at least one leg extending into one of said stator slots and adapted to be magnetically coupled with the magnetic field generated by said rotor upon rotation of said rotor;
   a winding magnetically coupled with said core and within whch there is induced an alternating electrical signal having a frequency proportional to the speed of said rotor relative to said stator; and
   means for mounting said one leg within said one stator slot, said mounting means including an insulative member extending between and secured to the stator teeth on opposite sides of said one stator slot.

3. In a speed sensor for an electromagnetic machine of the type including the combination of a stator having a plurality of stator coils, a plurality of stator teeth, and a plurality of stator slots respectively between said teeth, and a rotor separated from said stator by an air gap, said rotor being adapted to rotate relative to said stator and generating a magnetic field inducing magnetic flux in said stator, the improvement comprising:

a magnetic core having at least one leg extending into one of said stator slots and adapted to be magnetically coupled with the magnetic field generated by said rotor upon rotation of said rotor, said core including another leg extending into another of said stator slots and a core portion connecting said legs, said core portion extending laterally outward from said one stator slot; and a winding magnetically coupled with said core and within which there is induced an alternating electrical signal having a frequency proportional to the speed of said rotor relative to said stator.

4. The improvement of claim 3, wherein said core includes a plurality of said legs extending into respectively corresponding ones of said stator slots and each adapted to be magnetically coupled with the magnetic field generated by said rotor, said core further including a plurality of core portions connecting said legs, said winding being magnetically coupled with each of said core portions.

5. The improvement of claim 4, wherein said winding is wrapped around each of said core portions.

6. The improvement of claim 4, wherein said core is of unitary construction, and each of said core portions and said legs is generally flat, said legs extending essentially perpendicular to the corresponding said core portions.

7. The improvement of claim 4, wherein said core is of unitary construction, said core portions and said legs being generally planar, said legs being connected to the corresponding one of said core portion by a pair of planar connecting portions extending generally perpendicular to said legs and said core portion.

8. The improvement of claim 4, wherein said legs are defined by a pair of L-shaped members each having a generally planar cross section, and a rod extending between and secured to one extremity of each of said L-shaped members.

9. The improvement of claim 4, wherein said core is of unitary construction having a circular cross sectional shape.

10. The improvement of claim 4, wherein each of said core portions includes an opening therein and said winding extends through the opening in each of said core portions.

11. In a speed sensor for an electromagnetic machine of the type including the combination of a stator having a plurality of stator coils, a plurality of stator teeth, and a plurality of stator slots respectively between said teeth, and a rotor separated from said stator by an air gap, said rotor being adapted to rotate relative to said stator and generating a magnetic field inducing magnetic flux in said stator, the improvement comprising:

a magnetic core having at least one leg extending into one of said stator slots and adapted to be magnetically coupled with the magnetic field generated by said rotor upon rotation of said rotor, said one leg being defined on one extremity of said core, the opposite extremity of said core being disposed external of said one stator slot and immediately adjacent said air gap whereby to pick up a sample of the magnetic flux, resulting from the magnetic field generated by said rotor; and a winding magnetically coupled with said core and within which there is induced an alternating electrical signal having a frequency proportional to the speed of said rotor relative to said stator.

12. The improvement of claim 11, wherein said one leg includes first and second spaced apart sections respectively disposed on opposite sides of one of said stator teeth.

13. The improvement of claim 11, wherein said opposite extremity abuts said one stator tooth.

14. In a speed sensor for an electromagnetic machine of the type including the combination of a stator having a plurality of stator coils, a plurality of stator teeth, and a plurality of stator slots respectively between said teeth, and a rotor separated from said stator by an air gap, said rotor being adapted to rotate relative to said stator and generating a magnetic field inducing magnetic flux in said stator, the improvement comprising:

a magnetic core having at least one leg extending into one of said stator slots and adapted to be magnetically coupled with the magnetic field generated by said rotor upon rotation of said rotor;

a winding magnetically coupled with said core and within which there is induced an alternating electrical signal having a frequency proportional to the speed of said rotor relative to said stator; and an electrically conductive sheath around said core portion, said winding being disposed around said sheath.

15. The improvement of claim 14, wherein said sheath includes a plurality of turns of an electrical coil having the opposite ends thereof electrically coupled together.

16. The improvement of claim 14, including an electrically conductive shield surrounding said winding and adapted to be electrically coupled to ground.

17. The improvement of claim 14, wherein said shield includes braided copper.

18. In a speed sensor for an electromagnetic machine of the type including the combination of a stator having a plurality of radially extending, circumferentially spaced stator teeth and a plurality of stator slots respectively between said teeth, and a rotor separated from said stator by an air gap, said rotor being adapted to rotate relative to said stator and generating a magnetic field inducing magnetic flux in said stator, the improvement comprising:

a magnetic core mounted laterally of said stator teeth and including a first portion adjacent said air gap and adapted to receive a sample of magnetic flux from the magnetic field generated by said rotor, said core including a second portion coupled with said first portion, said core being of unitary construction and said first portion of said core including a pair of legs extending into one of said stator slots; and means carried by said second portion of said core for producing an alternating signal using the sample of magnetic flux received by said first portion, said electrical signal having a frequency proportional to the angular velocity of said rotor.

19. The improvement of claim 18, wherein said second portion of said core extends between said legs and said producing means includes an electrical coil wrapped around said second portion.

20. In a speed sensor for an electromagnetic machine of the type including the combination of a stator having a plurality of radially extending, circumferentially spaced stator teeth and a plurality of stator slots respectively between said teeth, and a rotor separated from said stator by an air gap, said rotor being adapted to rotate relative to said stator and generating a magnetic field inducing magnetic flux in said stator, the improvement comprising:

a magnetic core mounted laterally of said stator teeth and including a first portion adjacent said air gap and adapted to receive a sample of magnetic flux from the magnetic field generated by said rotor, said core including a second portion coupled with said first portion; and means carried by said second portion of said core for producing an alternating electrical signal using the sample of magnetic flux received by said first portion, said electrical signal having a frequency proportional to the angular velocity of said rotor, said first portion of said core including a pair of legs extending into adjacent ones of said stator slots and said producing means including an electrical coil winding disposed around said second portion of said core.

21. In a speed sensor for an electromagnetic machine of the type including the combination of a stator having a plurality of radially extending, circumferentially spaced stator teeth and a plurality of stator slots respectively between said teeth, and a rotor separated from said stator by an air gap, said rotor being adapted to rotate relative to said stator and generating a magnetic field inducing magnetic flux in said stator, the improvement comprising:

a magnetic core mounted laterally of said stator teeth and including a first portion adjacent said air gap and adapted to receive a sample of magnetic flux from the magnetic field generated by said rotor, said first portion of said core including a pair of legs extending generally parallel to said stator teeth and respectively disposed immediately adjacent to adjacent ones of said stator slots, said core including a second portion coupled with said first portion; and means carried by said second portion of said core for producing an alternating electrical signal using the sample of magnetic flux received by said first portion, said electrical signal having a frequency proportional to the angular velocity of said rotor.

22. In a speed sensor for an electromagnetic machine of the type including the combination of a stator having a plurality of radially extending, circumferentially spaced stator teeth and a plurality of stator slots respectively between said teeth, and a rotor separated from said stator by an air gap, said rotor being adapted to rotate relative to said stator and generating a magnetic field inducing magnetic flux in said stator, the improvement comprising:

a magnetic core mounted laterally of said stator teeth and including a first portion adjacent said air gap and adapted to receive a sample of magnetic flux from the magnetic field generated by said rotor, said core including a second portion coupled with said first portion, said core being of unitary construction and substantially U-shaped; and means carried by said second portion of said core for producing an alternating electrical signal using the sample of magnetic flux received by said first portion, said electrical signal having a frequency proportional to the angular velocity of said rotor.

23. In a speed sensor for an electromagnetic machine of the type including the combination of a stator having a plurality of radially extending, circumferentially spaced stator teeth and a plurality of stator slots respectively between said teeth, and a rotor separated from said stator by an air gap, said rotor being adapted to rotate relative to said stator and generating a magnetic field inducing magnetic flux in said stator, the improvement comprising:

a magnetic core mounted laterally of said stator teeth and including a first portion adjacent said air gap and adpated to receive a sample of magnetic flux from the magnetic field generated by said rotor, said core including a second portion coupled with said first portion;

means for mounting said first portion of said core within one of said stator slots; and means carried by said second portion of said core for producing an alternating electrical signal using the sample of magnetic flux received by said first portion, said electrical signal having a frequency proportional to the angular velocity of said rotor.

24. The improvement of claim 23, wherein said mounting means includes an electrically insulative medium filling said one stator slot and captively holding said one portion of said core.

25. In a speed sensor for an electromagnetic machine of the type including the combination of a stator having a plurality of radially extending, circumferentially spaced stator teeth and a plurality of stator slots respectively between said teeth, and a rotor separated from said stator by an air gap, said rotor being adapted to rotate relative to said stator and generating a magnetic field inducing magnetic flux in said stator, the improvement comprising:

a magnetic core mounted laterally of said stator teeth and including a first portion adjacent said air gap and adapted to receive a sample of magnetic flux from the magnetic field generated by said rotor, said core including a second portion coupled with said first portion;

means carried by said second portion of said core for producing an alternating electrical signal using the sample of magnetic flux received by said first portion, said electrical signal having a frequency proportional to the angular velocity of said rotor; and an electrically conductive sheath surrounding said second portion of said core, said producing means including an elongate electrical conductor wrapped around said sheath.

26. The improvement of claim 25, wherein said sheath includes a plurality of turns of an electrical coil having the opposite ends thereof short circuited together.

27. The improvement of claim 25, including an electrically conductive shield surrounding said conductor and adapted to be electrically coupled to ground.

28. The improvement of claim 25, wherein said shield includes braided copper.

* * * * *